(No Model.)  J. C. HUNT.  3 Sheets—Sheet 1.
GRAIN SCOURER.

No. 303,734.  Patented Aug. 19, 1884.

Witnesses,
Geo. H. Strong.
J. F. Rouse

Inventor,
J. C. Hunt
By
Dewey & Co.
Attorneys (No Model.)  
J. C. HUNT.  
GRAIN SCOURER.

3 Sheets—Sheet 2.

No. 303,734. Patented Aug. 19, 1884.

(No Model.)　　　　　　　　　　　　　　　　3 Sheets—Sheet 3.
J. C. HUNT.
GRAIN SCOURER.

No. 303,734.　　　　　　　　Patented Aug. 19, 1884.

UNITED STATES PATENT OFFICE.

JOHN C. HUNT, OF CHICO, CALIFORNIA, ASSIGNOR OF ONE-HALF TO H. H. CAMPER, OF SAME PLACE.

GRAIN-SCOURER.

SPECIFICATION forming part of Letters Patent No. 303,734, dated August 19, 1884.

Application filed April 21, 1884. (No model.)

*To all whom it may concern:*

Be it known that I, JOHN C. HUNT, of Chico, county of Butte, and State of California, have invented an Improvement in Grain-Scourers; and I hereby declare the following to be a full, clear, and exact description thereof.

My invention relates to an apparatus for scouring or cleaning grain from foul surface matter and woody fiber, which embodies a series of rings or disks having peripheral teeth mounted close together and parallel upon a horizontal rotary shaft within an inclosing-case, through which a blast of air is drawn by a suction-fan, and through which the grain also passes by spiral feed. This case is perforated, and an outer case incloses it at a short distance, so as to form a passage between the two for the air-current, which may also pass into the inner cylinder through the perforations. Gates or valves control the air-current, and suitable discharge-openings are made for the cleaned grain and the refuse.

Figure 1:
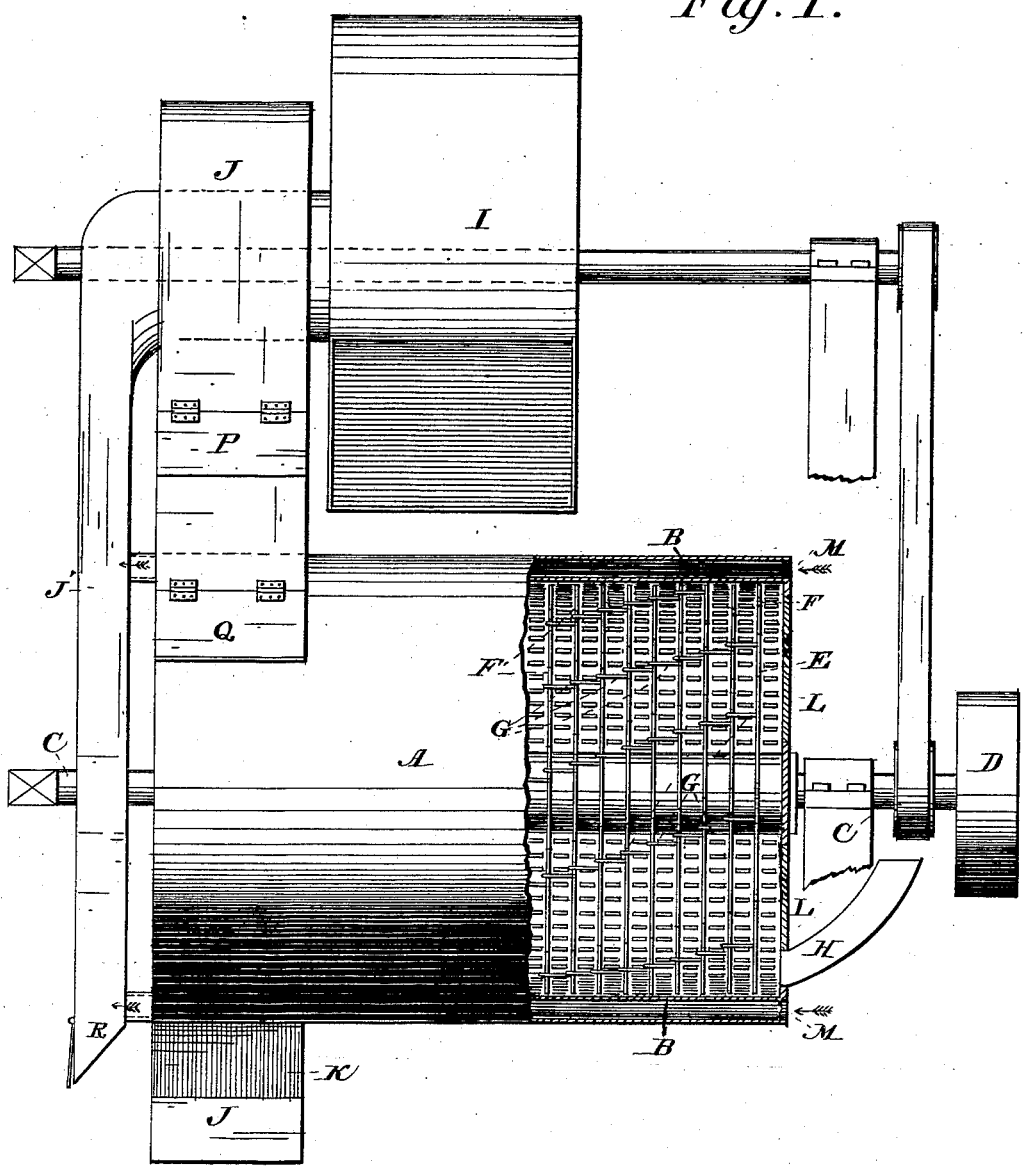
Figure 2:
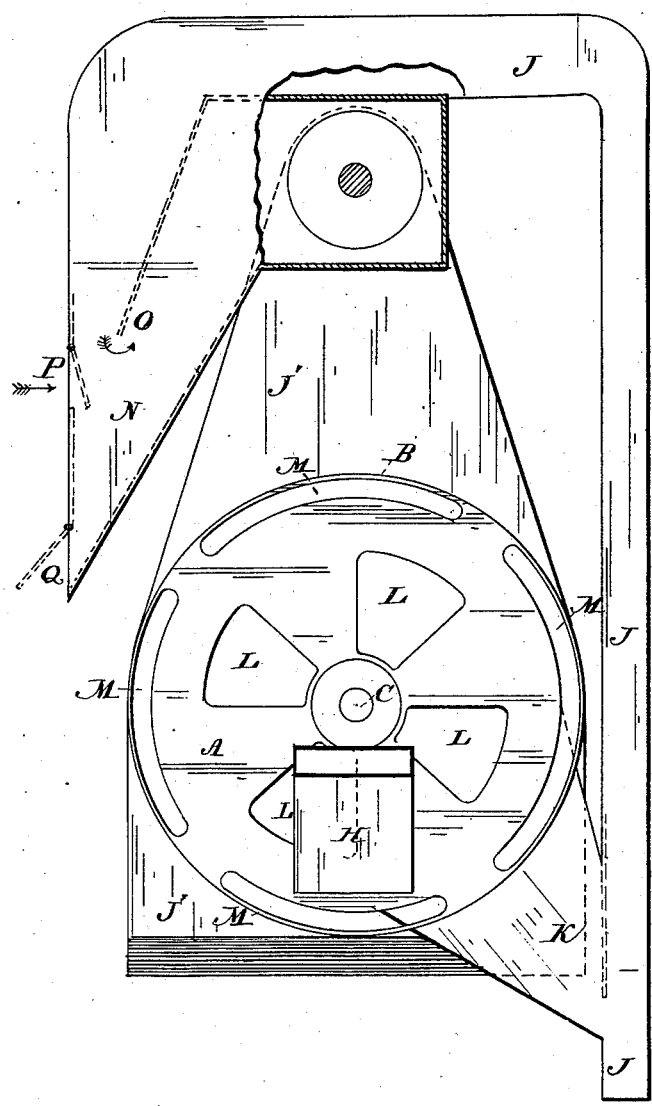
Figure 3:
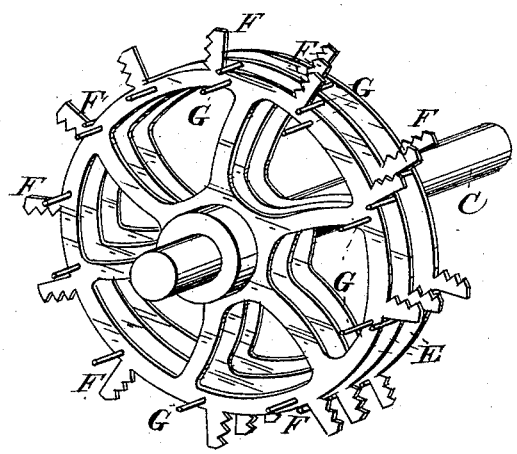

Referring to the accompanying drawings for a more complete explanation of my invention, Figure 1 is a side elevation of my apparatus, showing the fan, air-trunks, and the cylinder or case, with a part of one end broken away to show the interior and rings. Fig. 2 is an end view. Fig. 3 is a perspective view of some of the disks.

A is a stationary cylindrical casing fixed in a horizontal position, and having a second concentric shell, B, fixed within it.

C is a shaft extending through the interior cylinder from end to end, journaled in an exterior frame and having a driving-pulley, D, upon one end, by which it may be rotated. Upon this shaft, within the casing, are placed a series of disks or rims, E, which fit loosely upon the shaft, with the exception of the one nearest to the feed-opening, which is fixed. Arms F project radially from the rims E, and pins G extend from an arm upon one rim past the arms of the next, so that the fixed disk will, by means of these pins, drive all the other disks when the shaft is rotated. The front edges of the arms F are serrated, as shown, so that when the disks are revolved rapidly these arms, passing through a mass of grain admitted through a chute, H, at one end of the cylinder, will act to scour it and denude it of the outer woody and worthless material. In order to carry this away as fast as produced, I employ a suction-fan, I, which is fixed to rotate in its case above the cylinder A, and is connected with one end of the cylinder by a trunk, J, through which the dust is drawn.

J' is a second trunk, leading from the fan to the jacket or space between the cylinders, and through which dust from this space and a current of air are drawn. The trunk J connects at the lower end with the grain-discharge opening K, so that while the grain runs out the dust will be drawn upward through the trunk. The opposite end of the cylinder A has openings L, by which a greater or less current of air may be admitted to the interior of the cylinder at will. Slots or openings M around the edge open into the space between the two cylinders A and B, and any suitable valves may be used to control the admission of air to this space. The inner cylinder is provided with holes through which the air is allowed to enter the inner space and assist in cleansing the grain. The dust thus drawn out passes up through the trunk J, across a horizontal portion at the top, and thence down into the portion N and around the lower edge of a partition, O, from which point the dust passes up into the fan. Inwardly-opening gates or valves P allow fresh air to enter from the outside at this point, and this reduces the draft, so that any grain which may have been carried up to this point will be allowed to fall to the lowest point, and when it accumulates sufficiently it will open a gate, Q, and escape. The serrated arms F are held with relation to each other by the pins G, so as to act in the manner of a spiral conveyer, and thus advance the grain along the cylinder. The main portion of the grain passes out of the cylinder into the chute K, and escapes through a gate at its lower end. By this construction I produce a very efficient grain-scourer, and a means for completely removing the dust.

Having thus described my invention, what I claim as new, and desire to secure by Letters Patent, is—

1. In a grain-scouring apparatus, a horizontal perforated cylinder provided with an exterior casing, in combination with a series of interior revolving toothed disks, each disk provided with arms F, having serrated edges and a series of pins projecting at right angles to said disks, a grain supply and discharge chute at opposite ends, a suction-fan, and an exhaust-trunk connecting the casing and the grain-discharge chute with said fan, substantially as herein described.

2. The combination, in a grain-scouring apparatus, of a perforated horizontal cylinder provided with grain inlet and discharge spouts, a suction-fan connected with the discharge end thereof, an exterior casing formed with air-inlet openings, and a rotary shaft provided with a series of spirally-arranged toothed disks extending through the perforated cylinder, said disks having projecting pins G, engaging and driving adjacent disks, one of said disks being fixed to the shaft as a driver, substantially as herein described.

In witness whereof I have hereunto set my hand.

JOHN C. HUNT.

Witnesses:
W. J. COSTAR,
W. J. SEGRAVES.